United States Patent
Hanlon et al.

(10) Patent No.: US 9,815,438 B2
(45) Date of Patent: Nov. 14, 2017

(54) AIRCRAFT ELECTRIC BRAKE ACTUATOR ASSEMBLY WITH LINE REPLACEABLE ACTUATOR BRAKE

(75) Inventors: Casey Hanlon, Queen Creek, AZ (US); Kellan Geck, Chandler, AZ (US); James Neil Quitmeyer, Chandler, AZ (US)

(73) Assignee: Honeywell International Inc., Morris Plains, NJ (US)

( * ) Notice: Subject to any disclaimer, the term of this patent is extended or adjusted under 35 U.S.C. 154(b) by 1917 days.

(21) Appl. No.: 12/704,971

(22) Filed: Feb. 12, 2010

(65) Prior Publication Data
US 2011/0198163 A1  Aug. 18, 2011

(51) Int. Cl.
| | |
|---|---|
| F16D 55/02 | (2006.01) |
| B60T 7/04 | (2006.01) |
| B60T 8/00 | (2006.01) |
| B60T 13/74 | (2006.01) |
| F16D 65/18 | (2006.01) |
| F16D 125/40 | (2012.01) |
| F16D 125/48 | (2012.01) |
| F16D 127/06 | (2012.01) |

(52) U.S. Cl.
CPC ............... B60T 7/042 (2013.01); B60T 8/00 (2013.01); B60T 13/746 (2013.01); F16D 65/18 (2013.01); *F16D 2125/40* (2013.01); *F16D 2125/48* (2013.01); *F16D 2127/06* (2013.01)

(58) Field of Classification Search
CPC .......... B60T 7/042; B60T 8/00; B60T 13/746; F16D 2125/40; F16D 2125/48; F16D 2127/06
USPC ... 188/72.8, 72.7, 73.2, 71.5, 162–165, 265; 303/126
See application file for complete search history.

(56) References Cited

U.S. PATENT DOCUMENTS

| | | |
|---|---|---|
| 571,708 A | 11/1896 | Thompson |
| 2,510,114 A | 6/1950 | Hummel |
| 2,528,332 A | 10/1950 | Bergquist |
| (Continued) | | |

FOREIGN PATENT DOCUMENTS

| | | |
|---|---|---|
| EP | 0 936 373 A2 | 8/1999 |
| EP | 0 936 373 A3 | 1/2001 |
| (Continued) | | |

OTHER PUBLICATIONS

European Search Report from corresponding EP Application No. 11152817.0, mailed Jun. 21, 2011, 3 pages.
(Continued)

*Primary Examiner* — Robert A Siconolfi
*Assistant Examiner* — San Aung
(74) *Attorney, Agent, or Firm* — Shumaker & Sieffert, P.A.

(57) ABSTRACT

An aircraft electric brake actuator assembly includes an actuator housing, a motor housing, an actuator, an electric motor, and an actuator brake. The actuator housing is configured to be mounted on an aircraft landing gear. The motor housing is coupled to the actuator housing and is removable therefrom. The motor housing is also accessible when the actuator housing is mounted on an aircraft. The electric motor is disposed within the motor housing and is coupled to the actuator. The actuator brake is disposed within the motor housing and is removably coupled to the motor.

17 Claims, 6 Drawing Sheets

(56) References Cited

U.S. PATENT DOCUMENTS

| | | | |
|---|---|---|---|
| 2,725,123 A * | 11/1955 | Reuland | F16D 55/02 |
| | | | 188/171 |
| 3,401,867 A | 9/1968 | Long et al. | |
| 3,834,718 A | 9/1974 | Gyongyosi et al. | |
| 4,042,248 A | 8/1977 | Williamitis | |
| 4,430,592 A * | 2/1984 | Manktelow | F16D 55/02 |
| | | | 188/161 |
| 4,865,162 A | 9/1989 | Morris et al. | |
| 5,005,767 A | 4/1991 | Heren | |
| 5,111,854 A | 5/1992 | Begley et al. | |
| 5,400,885 A | 3/1995 | Phillips | |
| 5,497,860 A * | 3/1996 | Hendricks | F16D 55/28 |
| | | | 188/161 |
| 6,095,293 A | 8/2000 | Brundrett et al. | |
| 6,471,017 B1 * | 10/2002 | Booz | F16D 55/02 |
| | | | 188/162 |
| 6,559,566 B2 | 5/2003 | Modi et al. | |
| 6,581,730 B1 | 6/2003 | Haydon et al. | |
| 6,688,603 B2 | 2/2004 | vom Schemm | |
| 6,907,966 B2 | 6/2005 | Audren et al. | |
| 7,960,881 B2 | 6/2011 | Burton | |
| 8,037,971 B2 | 10/2011 | Chico et al. | |
| 2003/0197424 A1 * | 10/2003 | Frey | H02K 5/10 |
| | | | 303/3 |
| 2004/0214680 A1 | 10/2004 | Schoon | |
| 2005/0115778 A1 | 6/2005 | Chico et al. | |
| 2005/0247529 A1 * | 11/2005 | Gaines | F16D 65/18 |
| | | | 188/72.8 |
| 2005/0269872 A1 | 12/2005 | Ralea | |
| 2006/0032712 A1 * | 2/2006 | Kollaard | F16D 28/00 |
| | | | 188/72.8 |
| 2006/0102436 A1 * | 5/2006 | Haydon | F16D 55/36 |
| | | | 188/72.7 |
| 2008/0084109 A1 * | 4/2008 | Griffith | B60T 13/746 |
| | | | 303/89 |
| 2008/0110435 A1 * | 5/2008 | Baasch | F02D 11/106 |
| | | | 123/399 |
| 2008/0135349 A1 * | 6/2008 | Himes | F16D 65/0043 |
| | | | 188/71.5 |
| 2008/0169160 A1 | 7/2008 | Solignat et al. | |
| 2010/0090551 A1 | 4/2010 | Burton | |
| 2011/0132704 A1 | 6/2011 | Hanlon et al. | |

FOREIGN PATENT DOCUMENTS

| | | |
|---|---|---|
| EP | 1084949 A2 | 3/2001 |
| EP | 1 533 536 A1 | 5/2005 |
| EP | 2 060 821 A1 | 5/2009 |
| GB | 775052 | 5/1957 |
| WO | 2005001303 A2 | 1/2005 |
| WO | 2005001303 A3 | 1/2005 |
| WO | 2006025905 A1 | 3/2006 |
| WO | 2008144718 A1 | 11/2008 |

OTHER PUBLICATIONS

Responsive Amendment dated Aug. 9, 2012 for co-pending U.S. Appl. No. 12/732,771 (13 pgs.).
Office Action dated Oct. 23, 2012 for co-pending U.S. Appl. No. 12/732,771 (8 pgs.).
Office Action Response dated Jan. 23, 2012 for U.S. Appl. No. 12/732,771 (13 pages).
Response to Office Action dated May 1, 2013, from co-pending U.S. Appl. No. 12/732,771, filed Aug. 1, 2013, 15 pp.
Office Action dated May 1, 2013, from co-pending U.S. Appl. No. 12/732,771, 11 pages.
Office Action dated May 14, 2012, from co-pending U.S. Appl. No. 12/732,771, 7 pages.
Advisory Action dated Jan. 30, 2014 from U.S. Appl. No. 12/732,771, 5 pp.
Final Office Action from co-pending U.S. Appl. No. 12/732,771 dated Oct. 29, 2013. 12 pp.
Response to a Final Office Action dated Oct. 29, 2013 from U.S. Appl. No. 12/732,771, filed Jan. 16, 2014. 9 pp.
Appeal Brief from co-pending U.S. Appl. No. 12/732,771, filed Apr. 28, 2014, 33 pp.
Notice of Allowance from U.S. Appl. No. 12/732,771, dated Aug. 20, 2014, 12 pp.
Appeal Brief in Response to the Final Office and Advisory Action dated Oct. 29, 2013, and Feb. 28, 2014, from U.S. Appl. No. 12/732,771, filed Apr. 28, 2014, 33 pp.

* cited by examiner

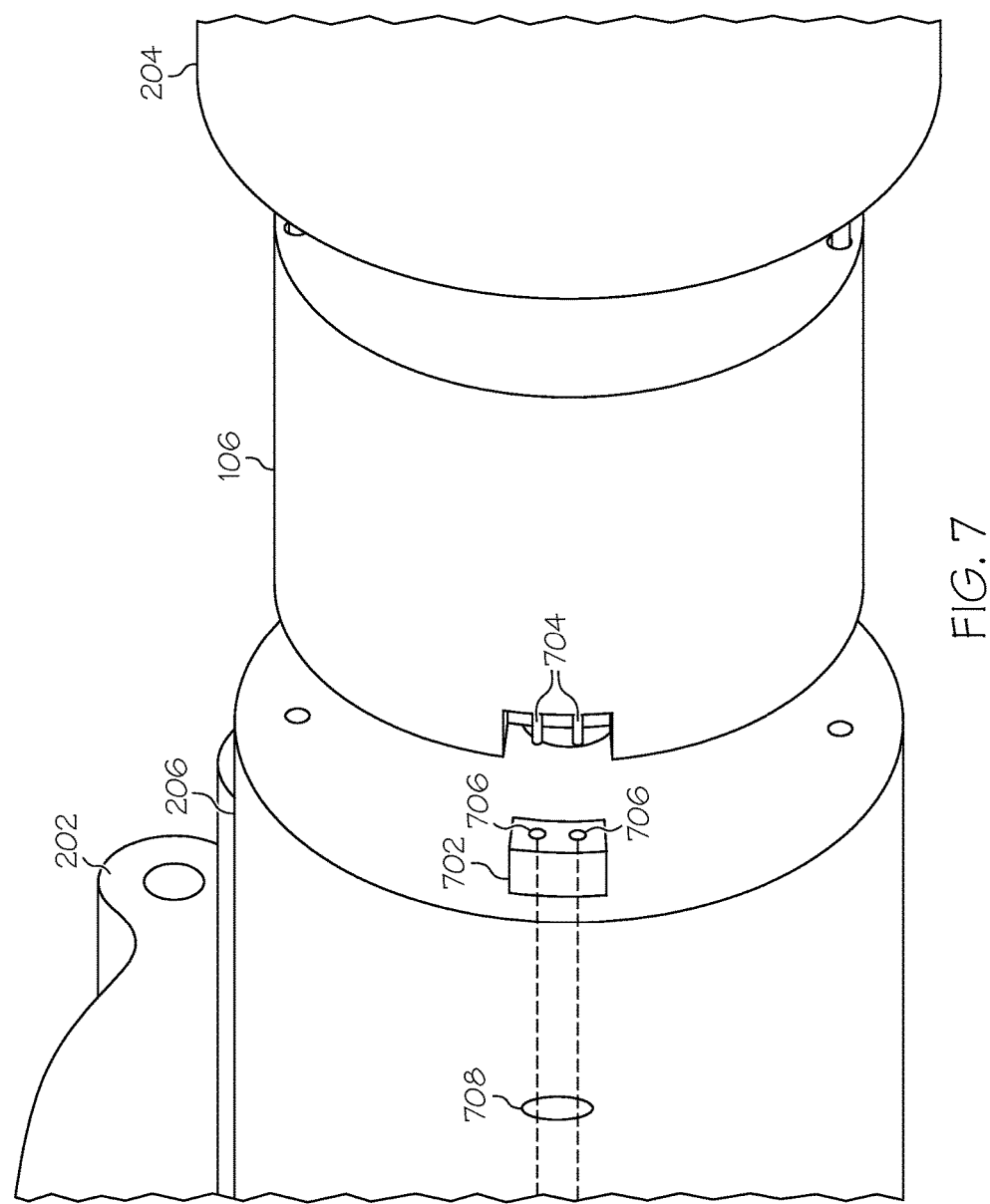

AIRCRAFT ELECTRIC BRAKE ACTUATOR ASSEMBLY WITH LINE REPLACEABLE ACTUATOR BRAKE

TECHNICAL FIELD

The present invention relates to aircraft brake actuation systems and, more particularly, to a brake actuation system including electric brake actuator assemblies that include a readily actuator brake.

BACKGROUND

When a jet-powered aircraft lands, the aircraft brakes, various aerodynamic drag sources (e.g., flaps, spoilers, etc.), and, in many instances, aircraft thrust reversers, are used to slow the aircraft down in the desired amount of runway distance. Once the aircraft is sufficiently slowed, and is taxiing from the runway toward its ground destination, the aircraft brakes are used slow the aircraft, and bring it to a stop at its final ground destination.

Presently, many aircraft brake systems include a plurality of hydraulic or electromechanical actuators, and a plurality of wheel mounted brakes. The brakes in many aircraft are implemented as multi-disk brakes, which include a plurality of stator disks and rotor disks. The stator disks and rotor disks may be alternately splined to a torque tube or wheel rim, and disposed parallel to one another, to form a brake stack. The actuators, in response to an appropriate pilot-initiated command, move between an engage position and a disengage position. In the engage position, the actuators each engage a brake stack, moving the brake disks into engagement with one another, to thereby generate the desired braking force.

As was noted above, the actuators used in some aircraft brake systems may be electromechanical actuators. An electromechanical actuator typically includes an electric motor and an actuator. The electric motor may supply a rotational drive force to the actuator, which converts the rotational drive force to translational motion, and thereby translate, for example, between a brake engage position and a brake disengage position.

Presently, aircraft brake system electromechanical actuators are configured as line replaceable units (LRUs). This means that each of the electromechanical actuators may, if needed, be removed from the aircraft and replaced with a new electromechanical actuator. At times, only select components of an electromechanical actuator may need to be replaced. However, present aircraft brake system electromechanical actuators are not configured such that various components are LRUs. In other words, present aircraft brake system electromechanical actuators are not configured to allow removal and replacement of individual components, such as the actuator brake, while the remainder of the electromechanical actuator remains installed on the aircraft.

Hence, there is a need for an aircraft brake system electromechanical actuator that is configured such that at least the actuator brake is an LRU. The present invention addresses at least this need.

BRIEF SUMMARY

In one exemplary embodiment, an aircraft electric brake actuator assembly includes an actuator housing, a motor housing, an actuator, an electric motor, and an actuator brake. The actuator housing is configured to be mounted on an aircraft landing gear. The motor housing is coupled to the actuator housing and is removable therefrom. The motor housing is also accessible when the actuator housing is mounted on an aircraft. The actuator is disposed within the actuator housing, is coupled to receive a drive torque and is configured, upon receipt of the drive torque, to translate to a position. The electric motor is disposed within the motor housing and is coupled to the actuator. The electric motor is adapted to be selectively energized and is configured, upon being energized, to rotate and thereby supply the drive torque to the actuator. The actuator brake is disposed within the motor housing and is removably coupled to the motor. The actuator brake is configured to selectively engage and disengage the motor to thereby at least inhibit motor rotation and allow motor rotation, respectively.

In another exemplary embodiment, an aircraft electric brake actuator assembly includes an actuator housing, a motor housing, an actuator, an electric motor, an electrically operated actuator brake, an electric connector, and a plurality of electrically conductive pins. The actuator housing is configured to be mounted on an aircraft landing gear. The motor housing is coupled to the actuator housing and is removable therefrom. The motor housing is also accessible when the actuator housing is mounted on an aircraft. The actuator disposed within the actuator housing, is coupled to receive a drive torque, and is configured, upon receipt of the drive torque, to translate to a position. The electric motor is disposed within the motor housing and is coupled to the actuator. The electric motor is adapted to be selectively energized and is configured, upon being energized, to rotate and thereby supply the drive torque to the actuator. The electrically operated actuator brake is disposed within the motor housing and is removably coupled to the motor. The actuator brake is configured to selectively engage and disengage the motor to thereby at least inhibit motor rotation and allow motor rotation, respectively. The electric connector extends from the motor, and the plurality of electrically conductive pins extend from the actuator brake and are removably connected to the electric connector.

In still another exemplary embodiment, an aircraft electric brake actuator assembly includes an actuator housing, a motor housing, an actuator, an electric motor, an electrically operated actuator brake, an electric connector, a plurality of actuator brake power conductors, and a plurality of electrically conductive pins. The actuator housing configured to be mounted on an aircraft landing gear. The motor housing is coupled to the actuator housing and is removable therefrom. The motor housing is accessible when the actuator housing is mounted on an aircraft. The actuator is disposed within the actuator housing, is coupled to receive a drive torque, and is configured, upon receipt of the drive torque, to translate to a position. The electric motor is disposed within the motor housing and is coupled to the actuator. The electric motor includes a first end, a second end, and a rotationally mounted shaft extending from the first end. The motor is adapted to be selectively energized and is configured, upon being energized, to rotate and thereby supply the drive torque to the actuator. The electrically operated actuator brake is disposed within the motor housing and is removably coupled to the motor. The actuator brake is configured to be selectively de-energized and energized to selectively engage and disengage the shaft, respectively, and thereby at least inhibit motor rotation and allow motor rotation, respectively. The electric connector extends from the second end of the motor. The plurality of actuator brake power conductors extend through the motor to the electric connector and are adapted to couple to a direct current (DC) electric power source. The plurality of electrically conductive pins extend from the actuator brake and are removably connected to the electric connector.

Other desirable features and characteristics of the present invention will become apparent from the subsequent detailed description and the appended claims, taken in conjunction with the accompanying drawings and preceding background.

BRIEF DESCRIPTION OF THE DRAWINGS

The present invention will hereinafter be described in conjunction with the following drawing figures, wherein like numerals denote like elements, and wherein:

FIG. 7 depicts a close-up portion of a motor and actuator brake that make up the actuator assembly of FIGS. 2 and 3.

DETAILED DESCRIPTION OF A PREFERRED EMBODIMENT

The following detailed description is merely exemplary in nature and is not intended to limit the invention or the application and uses of the invention. Furthermore, there is no intention to be bound by any theory presented in the preceding background or the following detailed description.

Figure 1:
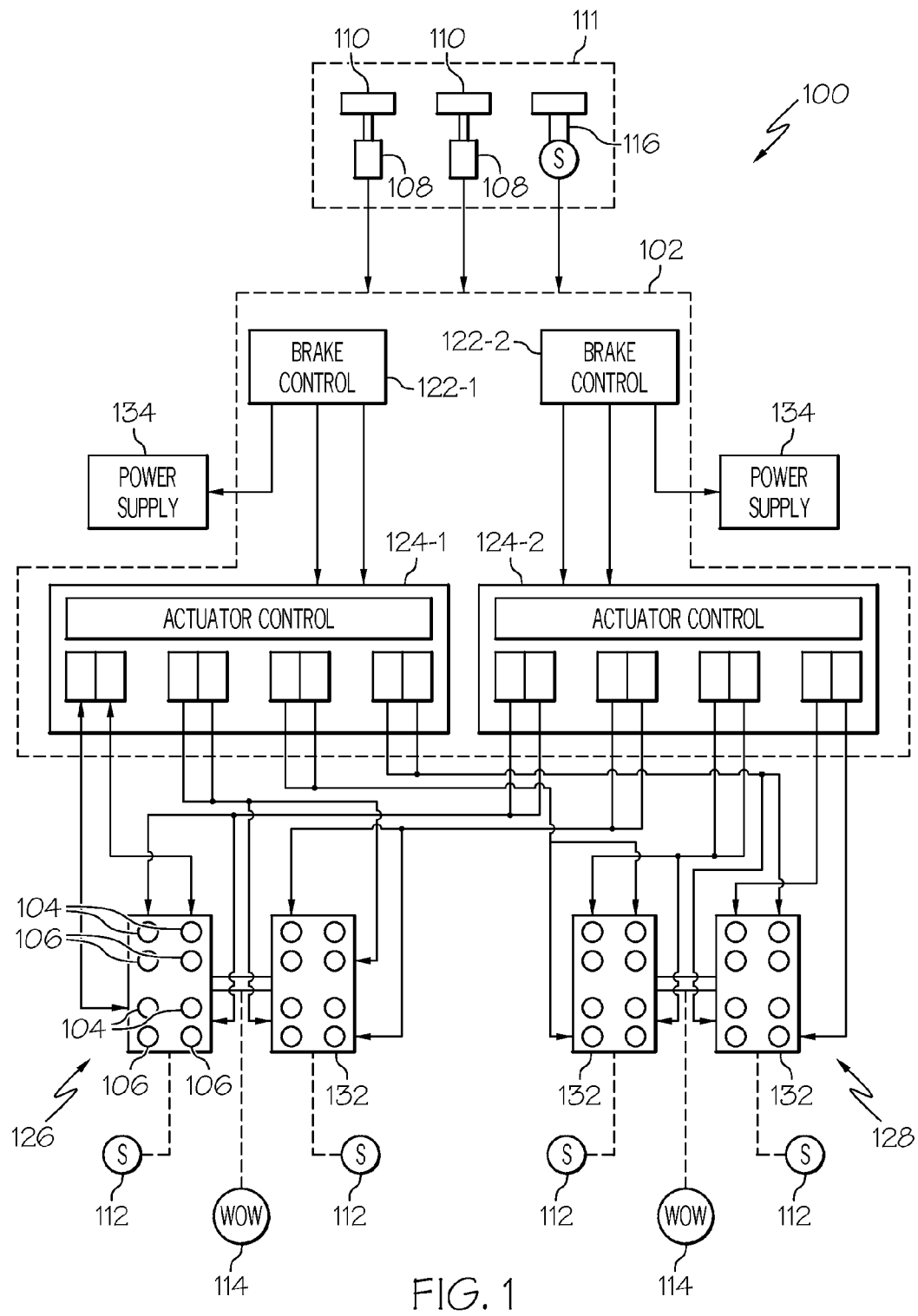
FIG. 1 depicts a functional block diagram of an exemplary embodiment of aircraft brake actuation system.

Turning now to the description, and with reference first to FIG. 1, a functional block diagram of an exemplary aircraft brake actuation system 100 is shown. In the depicted embodiment, the system 100 includes a control circuit 102, a plurality of electric brake actuator assemblies 104, and a plurality of actuator brakes 106. The control circuit 102 receives brake command signals that are representative of a desired brake force. The brake command signals are supplied from, for example, brake pedal transducers 108 that are coupled to brake pedals 110 located in an aircraft cockpit 111. The brake pedal transducers 108 are preferably implemented using position sensors, which provide position signals representative of the position of the brake pedals 110. The control circuit 102, using the position signals and the known spring rate of a return spring (not illustrated) coupled to the brake pedals 110, calculates the application force a pilot is supplying to the brake pedals 110. It will be appreciated that the brake pedal transducers 108 may be implemented using any one of numerous types of position sensors now known or developed in the future. In a particular embodiment, LVDT (linear variable differential transformer) position sensors are used. Moreover, other types of sensors, such as force sensors, could also be used if desired.

The control circuit 102 also receives one or more signals representative of aircraft operational state. The number and type of sensors used to supply the one or more signals representative of operational state may vary. In the depicted embodiment the sensors include one or more wheel speed sensors 112, one or more weight-on-wheels sensors 114, and one or more throttle position sensors 116. The one or more wheel speed sensors 112 are each configured to sense the rotational speed of an aircraft wheel 132 and supply a wheel speed signal representative thereof. The one or more weight-on-wheels sensors 114 are each configured to sense when the aircraft is on the ground (or other surface) and supply a signal representative thereof. The one or more engine throttle position sensors 116 are each configured to sense the position of the aircraft engine throttle and supply an engine throttle position signal representative thereof. It will be appreciated that the wheel speed sensors 112, the weight-on-wheels sensors 114, and the engine throttle position sensors 116 may be implemented using any one of numerous types of sensors now known or developed in the future.

The control circuit 102 is configured to process the brake command signals supplied from the brake pedal transducers 108, and controllably energize the electric brake actuator assemblies 104 to move to a brake position that corresponds to the commanded brake force. The control circuit 102 is also configured to process the brake command signals to determine when the brake pedal application force supplied from the pilot exceeds a set force magnitude and, upon exceeding the set force magnitude, when the brake pedal application force is less than a reset force magnitude. The control circuit 102 is additionally configured to process the one or more signals representative of aircraft operational state to determine when the aircraft is in a ground-idle state. The control circuit 102, based on these determinations, selectively supplies actuator brake commands to the actuator brakes 106 and selectively de-energizes and re-energizes the electric brake actuator assemblies 104. This latter functionality will be described in more detail further below.

Before proceeding further, it is noted that the term "ground-idle state," as used herein, means that the aircraft is on the ground (or other surface), the aircraft is stationary (or at least moving at less than a predetermined speed), and the aircraft engines are in an idle running state. The engines may be in an idle running state when, for example, the engine throttles are positioned to a ground-idle position. It will be appreciated, however, that various other engine throttle positions could be used to indicate that the aircraft engines are in an idle running state.

Returning now to the system description, it will be appreciated that the control circuit 102 may be variously configured to implement the functionality described above. In the depicted embodiment, however, the control circuit 102 includes a plurality of brake controls 122 and a plurality of actuator controls 124. Each brake control 122 is coupled to receive the one or more operational state signals and the brake command signals and is configured, in response to these signals, to supply actuator commands, the friction brake commands, and power enable/disable commands. In a particular preferred embodiment, the brake controls 122 translate the calculated brake pedal application forces to command force levels for the electric brake actuator assemblies 104. In the depicted embodiment, the control circuit 102 includes two brake controls 122-1, 122-2 to provide suitable redundancy. It will be appreciated, however, that the control circuit 102 could be implemented with more or less than this number of brake controls 122.

The actuator controls 124 are each coupled to receive the actuator commands and are each configured, in response to the actuator commands, to controllably energize a plurality of the electric brake actuator assemblies 104 to move to a brake position that corresponds to the commanded brake force. In the depicted embodiment, the control circuit 102 includes two multi-channel actuator controls 124-1, 124-2 to provide suitable redundancy. The number of channels in each actuator control 124 may vary depending, for example, on the number of electric brake actuator assemblies 104. This is because each channel in an actuator control 124 is preferably associated a single electric brake actuator 104. In the depicted embodiment, the system 100 is configured to be used with an aircraft that includes a left landing gear 126 and a right landing gear 128, with each landing gear having two wheels 132—an inboard wheel and an outboard wheel. The system 100 is additionally configured so that four electric brake actuator assemblies 104 are associated with each wheel 132, and all four of the electric brake actuator assemblies 104 associated with the same wheel 132 apply a brake force to the same brake stack. There is one actuator brake 106 associated with each actuator 104. Thus, the system 100, at least in the depicted embodiment, includes a total of sixteen electric brake actuator assemblies 104 and sixteen actuator brakes 106, and each actuator control 124 includes eight channels for a total of sixteen channels. It will be appreciated that this is merely exemplary of a particular embodiment, and that the system 100 could be configured to include more or less than this number of electric brake actuator assemblies 104 and actuator brakes 106 and, concomitantly, channels per actuator control 124.

In addition to the redundancy provided via the plurality of actuator controls 124, the system 100 provides further redundancy by, as depicted in FIG. 1, coupling half of the electric brake actuator assemblies 104 associated with each wheel 132 to two channels in different actuator controls 124. For example, it is seen that two of the electric brake actuator assemblies 104 associated with the outboard wheel 132 of the left landing gear 126 are coupled to two independent channels in one actuator control 124-1, and the other two electric brake actuator assemblies 104 are coupled to two independent channels in the other actuator control 124-2. In this manner, even in the unlikely event one of the actuator controls 124 becomes inoperable, there will remain at least two operable electric brake actuator assemblies 104 associated with each wheel 132.

It will be appreciated that the control circuit 102 may be implemented using one or more general purpose processors, content addressable memory, digital signal processors, application specific integrated circuits, field programmable gate arrays, any suitable programmable logic devices, discrete gate or transistor logic, discrete hardware components, or any combination thereof, designed to perform the functions described herein. A processor may be realized as a microprocessor, a controller, a microcontroller, or a state machine. A processor may also be implemented as a combination of computing devices, e.g., a combination of a digital signal processor and a microprocessor, a plurality of microprocessors, one or more microprocessors in conjunction with a digital signal processor core, or any other such configuration.

No matter how the control circuit 102 is specifically implemented, each electric brake actuator 104 is configured, upon being controllably energized, to move to a brake position that corresponds to the commanded brake force, to thereby supply the desired brake force to its associated wheel 132. Moreover, the actuator brakes 106 are each configured, in response to the actuator brake commands supplied by the control circuit 102, to selectively move to an engage position or a disengage position to engage or disengage, respectively, one of the electric brake actuator assemblies 104. In the engage position, each actuator brake 106 holds its associated electric brake actuator assemblies 104 in the last commanded brake position.

As FIG. 1 additionally depicts, the system 100 may also include one or more power supplies (or power converters) 134. The power supplies 134 preferably provide electrical power to various portions of the control circuit 102, such as the actuator controls 124. The power supplies 134 are configured, in response to the power enable/disable signals supplied from the brake controls 122, to selectively remove electrical power from, and subsequently restore electrical power to, the actuator controls 124. The circumstances under which the control circuit 102 commands the power supplies 134 to remove electrical power from and subsequently restore electrical to the actuator controls 124 will be described in more detail further below.

Figure 2:
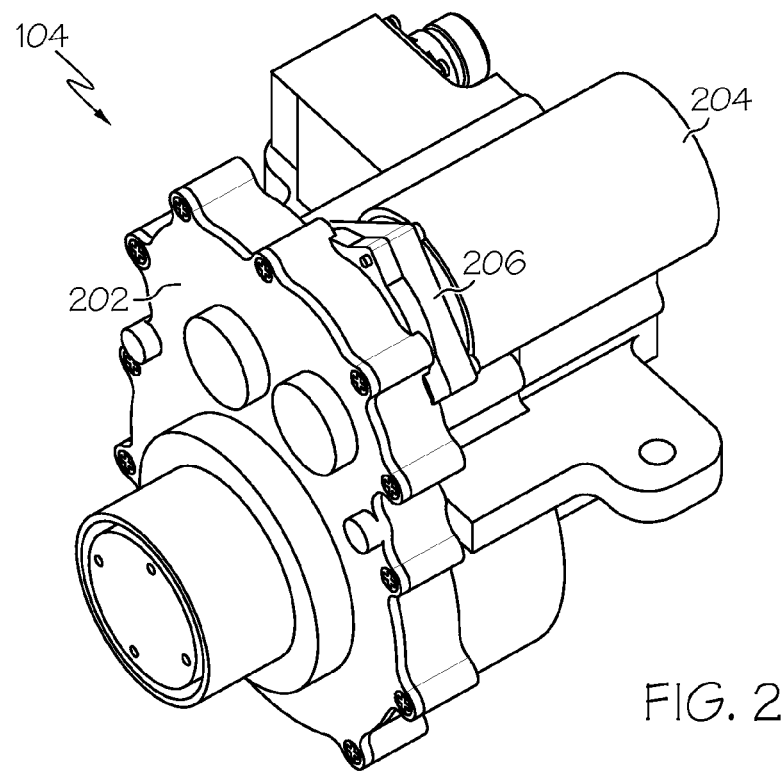
FIGS. 2 and 3 are front and rear perspective views, respectively, of an exemplary physical embodiment of an actuator assembly that may be used in the system of FIG. 1.
Figure 3:
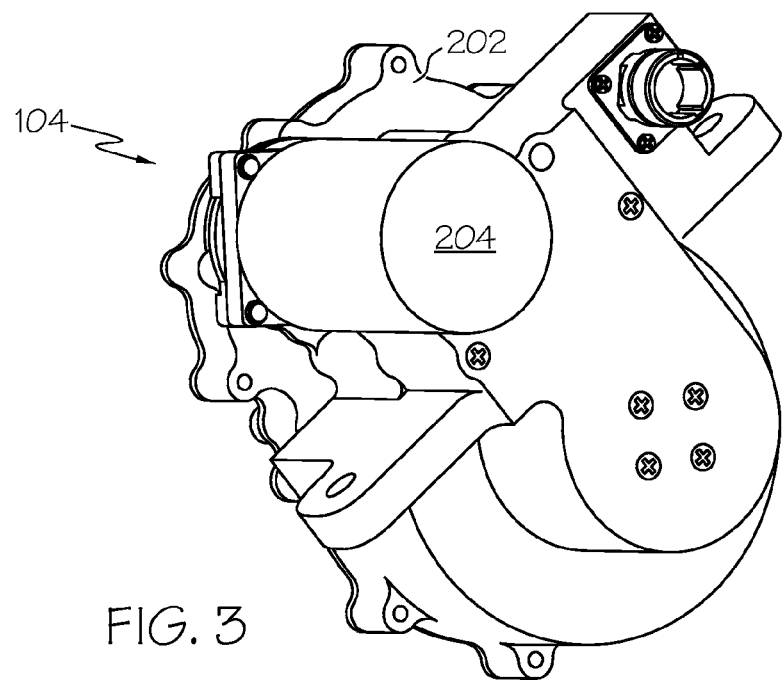
Figure 4:
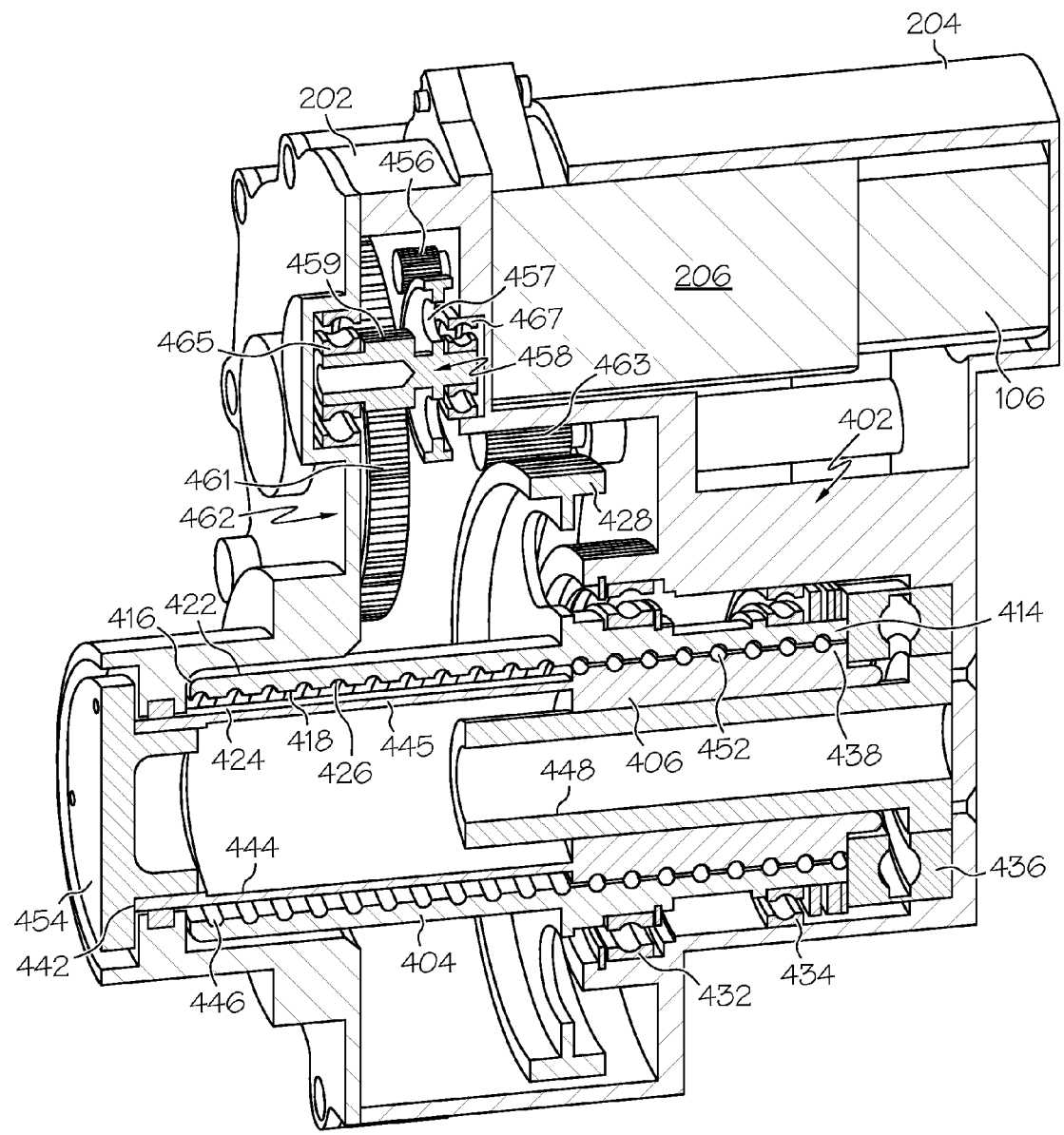
FIG. 4 is a cross section view of the actuator assembly depicted in FIGS. 2 and 3.
Figure 5:
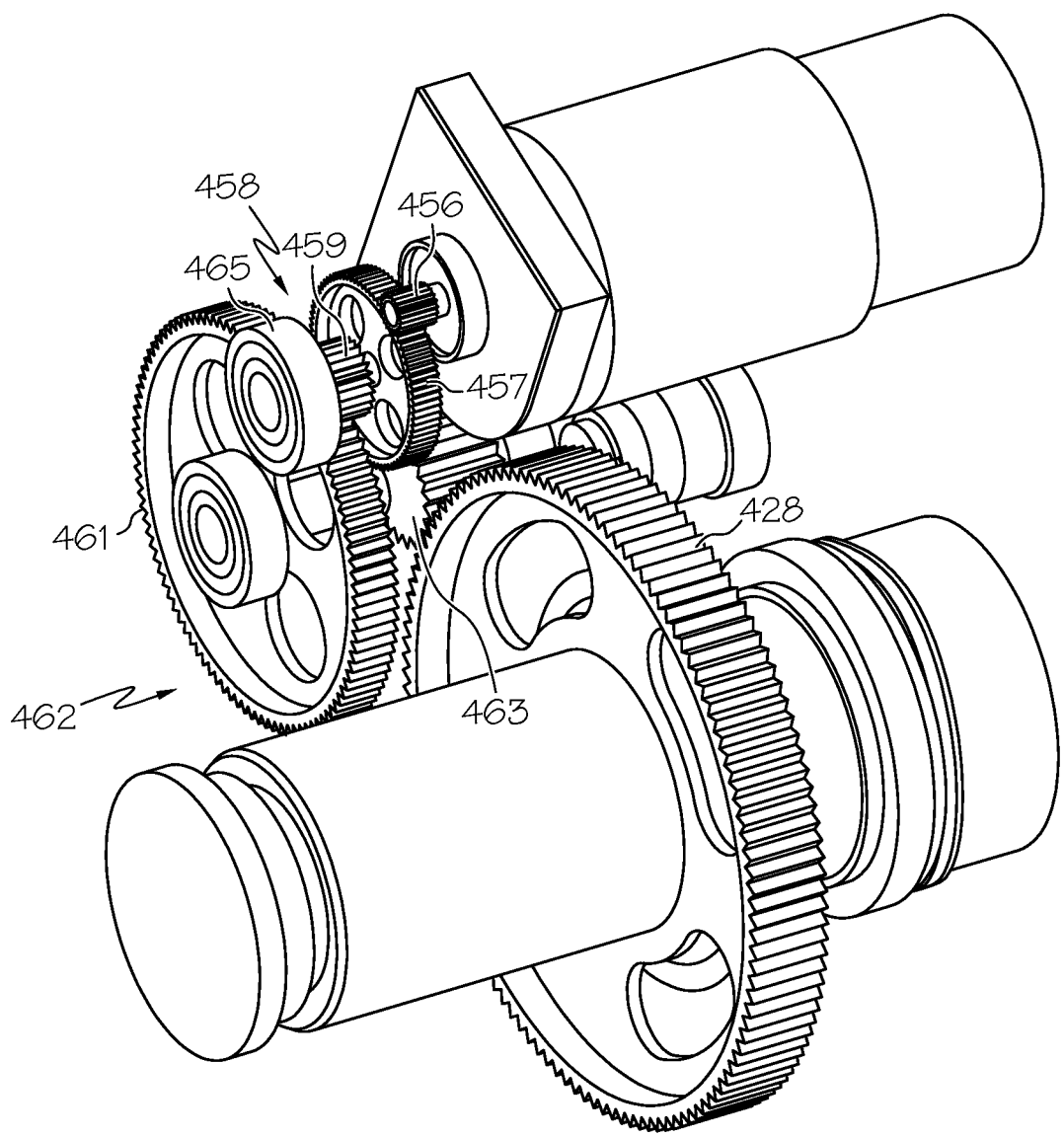
FIG. 5 is a perspective view of the exemplary actuator assembly depicted in FIGS. 2 and 3 with the housing portions depicted in a ghosted manner.

An embodiment of an exemplary physical implementation of one of the actuator assemblies 104 that may be used in the system 100 is depicted in FIGS. 2-8, and with reference thereto, will now be described. Referring first to FIGS. 2-4, it is seen that the actuator assembly 104 includes an actuator housing 202 and a removable motor housing 204. A motor 206 and an actuator brake 106 are disposed within the removable motor housing 204, and an actuator 402 (see FIG. 4) is disposed within the actuator housing 202. The motor 206 is configured to be controllably energized by one of the actuator controls 124 and, upon being energized, to rotate and supply a drive torque. The motor 206 may be any one of numerous types of electric motors. In a particular preferred embodiment, the motor 206 is implemented as a brushless DC motor. No matter the particular type of motor 206 that is used, the drive torque is supplied to the actuator 402, an embodiment of which, for completeness, will now be described.

As shown most clearly in FIG. 4, the actuator 402 includes a ballscrew 404 and a ballnut 406. The ballscrew 404 is rotationally mounted within the actuator housing 202 and includes a first end 414, a second end 416, an inner surface 418, and an outer surface 422. The ballscrew inner surface 418 defines a substantially cylindrical passageway 424 through the ballscrew 404, and has a plurality of ball grooves (or "threads") 426 formed thereon. The ballscrew 404 is coupled to receive the drive torque from the motor 206 and, in response thereto, to rotate. In the depicted embodiment, an input gear 428 is coupled to the ballscrew outer surface 422, and receives the drive torque, via a plurality of gears that are described further below, which in turn causes the ballscrew 404 to rotate. Although the ballscrew input gear 428 is shown disposed substantially centrally between the ballscrew first 414 and second 416 ends, it will be appreciated that this is merely exemplary of a particular preferred embodiment, and that the input gear could be coupled to other locations on the ballscrew outer surface 422, or to either the ballscrew first end 414 or second end 416.

A plurality of roller bearing assemblies, which includes a first roller bearing assembly 432 and a second roller bearing assembly 434, are mounted within the actuator housing 202 and are used to rotationally support the ballscrew 404 therein. Moreover, a thrust bearing assembly 436 is preferably disposed between the actuator housing 202 and the ballscrew first end 414. The thrust bearing 436 transfers any axial force supplied to the ballscrew 404 to the actuator housing 202.

The ballnut 406 is disposed at least partially within the ballscrew 404 and includes a first end 438 and a second end 442. An extension tube (or ram) 445 is coupled to the ballnut second end 442, and includes an inner surface 444, and an outer surface 446. The ballnut 406, and concomitantly the ram 445, are mounted against rotation within the actuator housing 202 and are configured, in response to rotation of the ballscrew 404, to translate axially within the ballscrew cylindrical passageway 424. It will be appreciated that the direction in which the ballnut 406 and ram 445 travel will depend on the direction in which the ballscrew 404 rotates. In the depicted embodiment, an anti-rotation shaft 448 is coupled to the actuator housing 202 and engages the ballnut 406 to prevent its rotation. It will be appreciated that the anti-rotation shaft 448 and ballnut 406 may be configured in any one of numerous ways to prevent ballnut rotation. In the depicted embodiment, the anti-rotation shaft 448 is disposed at least partially within a groove (not shown) formed in a portion of the ballnut inner surface 444, to thereby prevent its rotation.

The ballnut 406, similar to the ballscrew 404, has a plurality of ball grooves (or "threads") 452 formed therein. However, unlike the ballscrew ball grooves 426, the ballnut ball grooves 452 are formed in the ballnut outer surface 446. A plurality of non-illustrated balls are disposed within the ballnut ball grooves 452, and in selected ones of the ballscrew ball grooves 426. The balls, in combination with the ball grooves 426, 452, convert the rotational movement of the ballscrew 404 into the translational movement of the ballnut 406 and ram 445. A pad 454 is coupled to the ram second end 442. The pad 454 engages an aircraft brake element (not shown) when the brake actuator 106 is commanded to an engage position.

As was mentioned above, the drive torque of the motor 206 is supplied to the ballscrew 404 via a plurality of gears. With reference now to both FIGS. 4 and 5, it may be seen that in the depicted embodiment the gears include a motor output gear 456, a first intermediate gear set 458, a second intermediate gear set 462, and the ballscrew input gear 428. The motor output gear 456 is coupled to the motor 206, and engages the first intermediate gear set 458. Thus, the motor output gear 456 receives the drive torque directly therefrom, and causes the first intermediate gear set 458 to rotate in response thereto. The first intermediate gear set 458 includes two gears, an input gear 457 and an output gear 459, and is rotationally mounted within the actuator housing 202 via third and fourth roller bearing assemblies 465 and 467, respectively. The first intermediate gear set input gear 457 engages the motor output gear 456, and the first intermediate gear set output gear 459 engages the second intermediate gear set 462.

The second intermediate gear set 462, similar to the first intermediate gear set 458, is rotationally mounted and includes two gears. More specifically, the second intermediate gear set 462 is rotationally mounted in the actuator housing 202 via non-depicted fifth and sixth roller bearing assemblies, and includes an input gear 461 and an output gear 463. The second intermediate gear set input gear 461 engages the first intermediate gear set output gear 459, and the second intermediate gear set output gear 463 engages the ballscrew input gear 428.

With the above-described gear configuration, the first intermediate gear set 458 receives, via the motor output gear 456, the drive torque supplied by the motor 206. As a result, the first intermediate gear set 458 rotates, and supplies the drive torque to the second intermediate gear set 462. In turn, the second intermediate gear set 462 rotates and supplies the drive torque to the ballscrew input gear 428, which causes the ballscrew 404 to rotate. It will be appreciated that the gear ratio between the motor output gear 456 and the first intermediate gear set input gear 457 provides a first rotational speed reduction, and the gear ratio between the first intermediate gear set output gear 459 and the second intermediate gear set 462 provides a second rotational speed reduction. It will be appreciated that the individual and/or collective gear ratios and the concomitant individual and/or collective rotational speed reductions may vary to achieve a desired torque-speed characteristic for the brake actuator 106.

Figure 6:
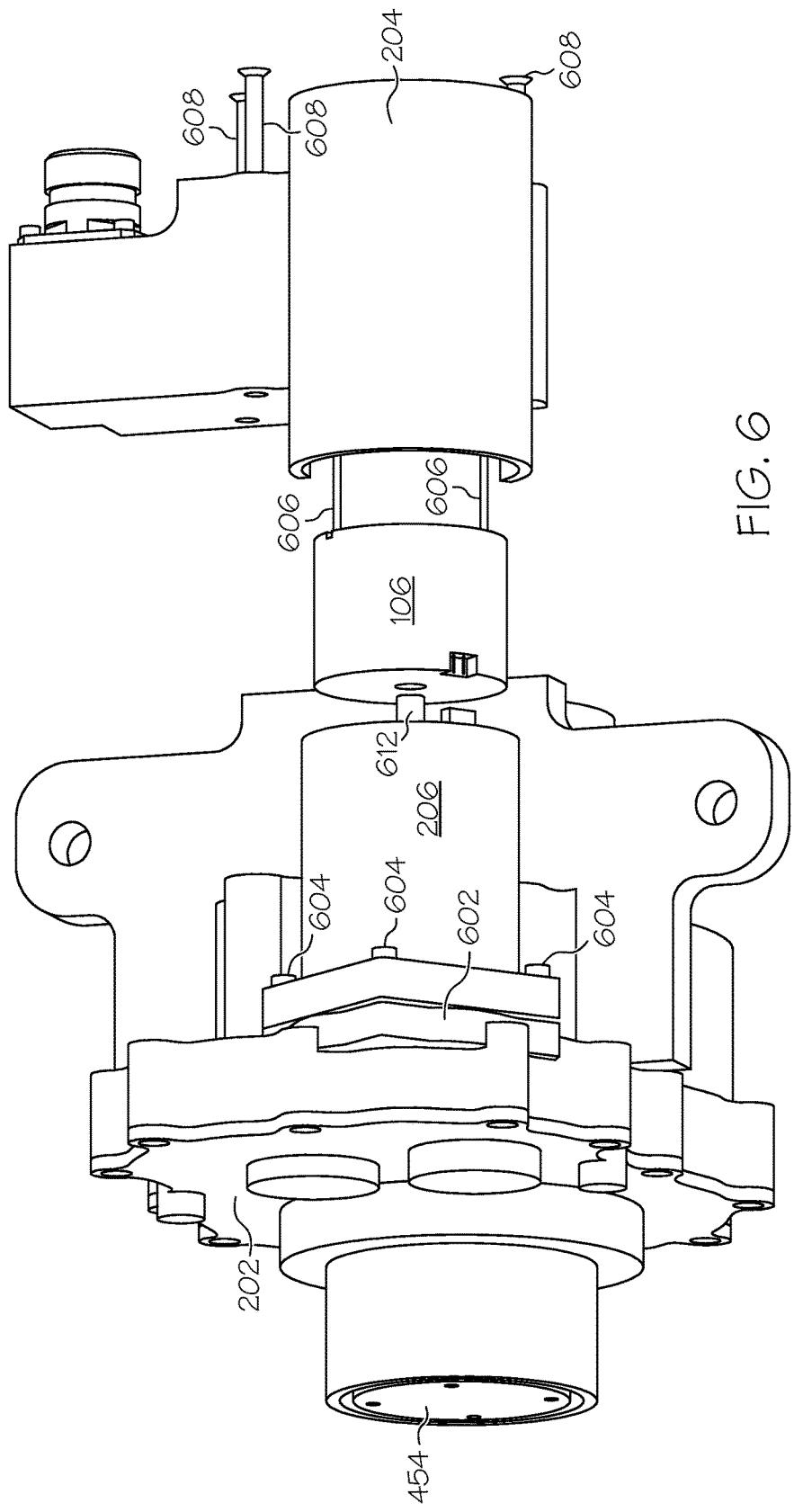
FIG. 6 depicts the actuator assembly of FIGS. 2 and 3 in a partially disassembled state.

Referring now to FIG. 6, it was noted above that the motor 206 and actuator brake 106 are disposed within the removable motor housing 204. More specifically, it is seen that the motor 206 is removably coupled to a mounting flange 602 on the actuator housing 202 via a plurality of motor mounting bolts 604. Moreover, the actuator brake 106 is removably coupled to the motor 206 via a plurality of actuator brake mounting bolts 606. The removable motor housing 204 envelopes at least a portion of the motor 206 and the actuator brake 106, and is removably coupled to the actuator housing 202 via a plurality of motor housing bolts 608. The removable motor housing 204 is also accessible when the actuator housing 202 is mounted on an aircraft landing gear. This configuration enables the actuator brake 106 to be removed and replaced in the field without the need for any special tools.

The actuator brake 106, as noted above, is configured to selectively move to an engage position or a disengage position to engage or disengage, respectively, the electric brake actuator assembly 104. More specifically, the actuator brake 106 is configured to selectively engage and disengage the motor 206 to thereby at least inhibit motor rotation and allow motor rotation, respectively. The depicted actuator brake 106 implements this functionality by selectively engaging and disengaging the motor shaft 612 (see FIG. 6), which extends from an end of the motor 206. Although the actuator brake 106 may be variously configured to implement its functionality, in the depicted embodiment, it is an electrically operated device that is configured to engage the motor shaft 612 when it is de-energized, and to disengage the motor shaft 612 when it is energized.

The motor 206 and actuator brake 106 are not only mechanically coupled together, but are also electrically coupled together. In particular, as shown most clearly in FIG. 7, an electric connector 702 extends from the motor 206 and a plurality of electrically conductive pins 704 extend from the actuator brake 106. The electrical connector 702 extends from the same end of the motor 206 as the motor shaft 612 and includes a plurality of receptacles 706. When the actuator brake 106 is securely coupled to the motor 206, each one of the plurality of electrically conductive pins 704 is disposed within one of the receptacles. As FIG. 7 also depicts in phantom, a plurality of actuator brake power conductors 708 may also extend from the electric connector 702 through the motor. Though not depicted in FIG. 7, the actuator brake power conductors 708 are configured to couple to a direct current (DC) electric power source such as, for example, one of the above-described actuator controls 124. Although the electric connector 702 and electrically conductive pins 704 are depicted as being configured as female and male connective devices, respectively, it will be appreciated that this is merely exemplary, and that the opposite configuration could be used. Moreover, the electric connector 702 could be disposed on the actuator brake 106 and the electrically conductive pins 704 could be disposed on the motor 206.

The actuator assembly configuration described herein allows the motor housing 204 to be removed from the actuator housing 202, even when the actuator housing is installed on an aircraft. The disclosed configuration further allows the actuator brake 106 to be removed and replaced, if needed, without having to remove other actuator assembly components.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. An aircraft electric brake actuator assembly, comprising:
   an actuator housing configured to be mounted on an aircraft landing gear;
   a motor housing coupled to the actuator housing and removable therefrom, the motor housing being accessible when the actuator housing is mounted on the aircraft landing gear;
   an actuator disposed within the actuator housing, the actuator being coupled to receive a drive torque and configured, upon receipt of the drive torque, to translate to a position;
   an electric motor disposed within the motor housing and coupled to the actuator, the electric motor being configured to be selectively energized and configured, upon being energized, to rotate and thereby supply the drive torque to the actuator;
   an actuator brake disposed within the motor housing and removably coupled to the motor, the actuator brake being configured to selectively engage and disengage the motor to thereby at least inhibit motor rotation and allow motor rotation, respectively, wherein the motor housing envelopes at least a portion of the electric motor and the actuator brake; and
   a mounting bolt, wherein the actuator brake is removably coupled to the motor via the mounting bolt.

2. The actuator assembly of claim 1, wherein:
   the electric motor includes a rotationally mounted shaft; and
   the actuator brake at least selectively engages the shaft.

3. The actuator assembly of claim 2, wherein the actuator brake is electrically operated.

4. The actuator assembly of claim 3, further comprising:
   an electric connector extending from the motor; and
   a plurality of electrically conductive pins extending from the actuator brake and removably connected to the electric connector.

5. The actuator assembly of claim 4, wherein:
   the motor includes a first end and a second end;
   the shaft extends from the first end; and
   the electric connector extends from the second end.

6. The actuator assembly of claim 4, further comprising a plurality of actuator brake power conductors extending through the motor to the electric connector, the actuator brake power conductors being configured to couple to a direct current (DC) electric power source.

7. The actuator assembly of claim 3, wherein the actuator brake is configured to (i) engage the motor when it is electrically de-energized and (ii) disengage the motor when it is electrically energized.

8. An aircraft electric brake actuator assembly, comprising:
   an actuator housing configured to be mounted on an aircraft landing gear;
   a motor housing coupled to the actuator housing and removable therefrom, the motor housing being accessible when the actuator housing is mounted on the aircraft landing gear;
   an actuator disposed within the actuator housing, the actuator coupled to receive a drive torque and configured, upon receipt of the drive torque, to translate to a position;
   an electric motor disposed within the motor housing and coupled to the actuator, the electric motor being configured to be selectively energized and configured, upon being energized, to rotate and thereby supply the drive torque to the actuator, wherein the motor includes a first end and a second end, and a rotationally mounted shaft extending from the first end;
   an electrically operated actuator brake disposed within the motor housing and removably coupled to the motor, the actuator brake being configured to selectively engage and disengage the motor to thereby at least inhibit motor rotation and allow motor rotation, respectively, wherein the motor housing envelopes at least a portion of the electric motor and the actuator brake, wherein the actuator brake at least selectively engages the rotationally mounted shaft of the electric motor;
   an electric connector extending from the second end of the motor; and
   a plurality of electrically conductive pins extending from the actuator brake and removably connected to the electric connector.

9. The actuator assembly of claim 8, further comprising a plurality of actuator brake power conductors extending through the motor to the electric connector, the actuator brake power conductors being configured to couple to a direct current (DC) electric power source.

10. The actuator assembly of claim 8, wherein the actuator brake is configured to (i) engage the motor when it is electrically de-energized and (ii) disengage the motor when it is electrically energized.

11. An aircraft electric brake actuator assembly, comprising:
   an actuator housing configured to be mounted on an aircraft;
   a motor housing coupled to the actuator housing and removable therefrom, the motor housing being accessible when the actuator housing is mounted on an aircraft landing gear;
   an actuator disposed within the actuator housing, the actuator coupled to receive a drive torque and configured, upon receipt of the drive torque, to translate to a position;
   an electric motor disposed within the motor housing and coupled to the actuator, the electric motor including a first end, a second end, and a rotationally mounted shaft extending from the first end, the motor being configured to be selectively energized and configured, upon being energized, to rotate and thereby supply the drive torque to the actuator;
   an electrically operated actuator brake disposed within the motor housing and removably coupled to the motor, the actuator brake being configured to be selectively de-energized and energized to selectively engage and disengage the shaft, respectively, and thereby at least inhibit motor rotation and allow motor rotation, respectively, wherein the motor housing envelopes at least a portion of the electric motor and the actuator brake;

an electric connector extending from the second end of the motor;

a plurality of actuator brake power conductors extending through the motor to the electric connector, the actuator brake power conductors being configured to couple to a direct current (DC) electric power source; and a plurality of electrically conductive pins extending from the actuator brake and removably connected to the electric connector.

12. The aircraft electric brake actuator assembly of claim 1, wherein the mounting bolt comprises an actuator brake mounting bolt, the assembly further comprising a motor mounting bolt, wherein the actuator housing comprises a mounting flange, and the motor is removably coupled to the mounting flange via the motor mounting bolt.

13. The aircraft electric brake actuator assembly of claim 1, further comprising a bolt, wherein the motor housing is removably coupled to the actuator housing via the bolt.

14. The aircraft electric brake actuator assembly of claim 8, further comprising a motor mounting bolt and an actuator brake mounting bolt, wherein the actuator housing comprises a mounting flange and the motor is removably coupled to the mounting flange via the motor mounting bolt, and wherein the actuator brake is removably coupled to the motor via the actuator brake mounting bolt.

15. The aircraft electric brake actuator assembly of claim 8, further comprising a bolt, wherein the motor housing is removably coupled to the actuator housing via the bolt.

16. The aircraft electric brake actuator assembly of claim 11, further comprising a motor mounting bolt and an actuator brake mounting bolt, wherein the actuator housing comprises a mounting flange and the motor is removably coupled to the mounting flange via the motor mounting bolt, and wherein the actuator brake is removably coupled to the motor via the actuator brake mounting bolt.

17. The aircraft electric brake actuator assembly of claim 11, further comprising a bolt, wherein the motor housing is removably coupled to the actuator housing via the bolt.

* * * * *